(12) United States Patent
Macwan

(10) Patent No.: US 8,429,275 B2
(45) Date of Patent: Apr. 23, 2013

(54) METHOD AND APPARATUS FOR CREATING A SOCIAL NETWORK MAP OF NON-VOICE COMMUNICATIONS

(75) Inventor: Sanjay Macwan, Marlboro, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 168 days.

(21) Appl. No.: 12/569,471

(22) Filed: Sep. 29, 2009

(65) Prior Publication Data

US 2011/0078252 A1   Mar. 31, 2011

(51) Int. Cl.
*G06F 15/173*   (2006.01)

(52) U.S. Cl.
USPC ........... 709/226; 709/201; 709/202; 709/203; 709/204; 709/206; 709/223; 709/224

(58) Field of Classification Search .............. 709/201, 709/202, 203, 204, 205, 206, 223, 224, 225, 709/226

See application file for complete search history.

(56) References Cited

U.S. PATENT DOCUMENTS

| | | | |
|---|---|---|---|
| 7,831,544 B1* | 11/2010 | Panchbudhe et al. | 707/602 |
| 2006/0173957 A1* | 8/2006 | Robinson et al. | 709/204 |
| 2007/0106780 A1* | 5/2007 | Farnham et al. | 709/223 |
| 2008/0172257 A1* | 7/2008 | Bisker et al. | 705/4 |
| 2010/0145771 A1* | 6/2010 | Fligler et al. | 705/10 |
| 2010/0287281 A1* | 11/2010 | Tirpak | 709/226 |

* cited by examiner

*Primary Examiner* — Liangche A Wang
*Assistant Examiner* — Cheikh Ndiaye

(57) ABSTRACT

A method, apparatus and computer readable medium for creating a social network map using non-voice communications are disclosed. For example, the method registers employment data of an employee, monitors non-voice communications of the employee, generates a social network map of the non-voice communications of the employee and analyzes the social network map to provide at least one correlation.

17 Claims, 4 Drawing Sheets

METHOD AND APPARATUS FOR CREATING A SOCIAL NETWORK MAP OF NON-VOICE COMMUNICATIONS

The present disclosure relates generally to communication networks and, more particularly, to a method and apparatus for creating a social network map of non-voice communications.

BACKGROUND

Some large companies or enterprises have thousands of employees around the world that may not be well connected to each other. Thus, some employees who have worked extensively on a specific project or have developed a knowledge base on a specific topic may not be connected to other employees within the same company to allow the other employees to take advantage of the knowledge base of some employees. As a result, other employees have no easy way to quickly find other employees who may be deemed as an expert on a specific topic or a specific project. In addition, enterprises currently do not have an efficient and quick way to see which employees are communicating with each other.

SUMMARY

In one embodiment, the present disclosure discloses a method, an apparatus and a computer readable medium for creating a social network map of non-voice communications. For example, the method registers employment data of an employee, monitors non-voice communications of the employee, generates a social network map of the non-voice communications of the employee and analyzes the social network map to provide at least one correlation.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, an apparatus and a computer readable medium for creating a social network map of non-voice communications. Although the present disclosure is discussed below in the context of Internet Protocol (IP) Multimedia Subsystem (IMS) networks, the present disclosure is not so limited. Namely, the present disclosure can be applied to packet networks in general, e.g., Voice over Internet Protocol (VoIP) networks, Service over Internet Protocol (SoIP) networks, and the like.

Figure 1:
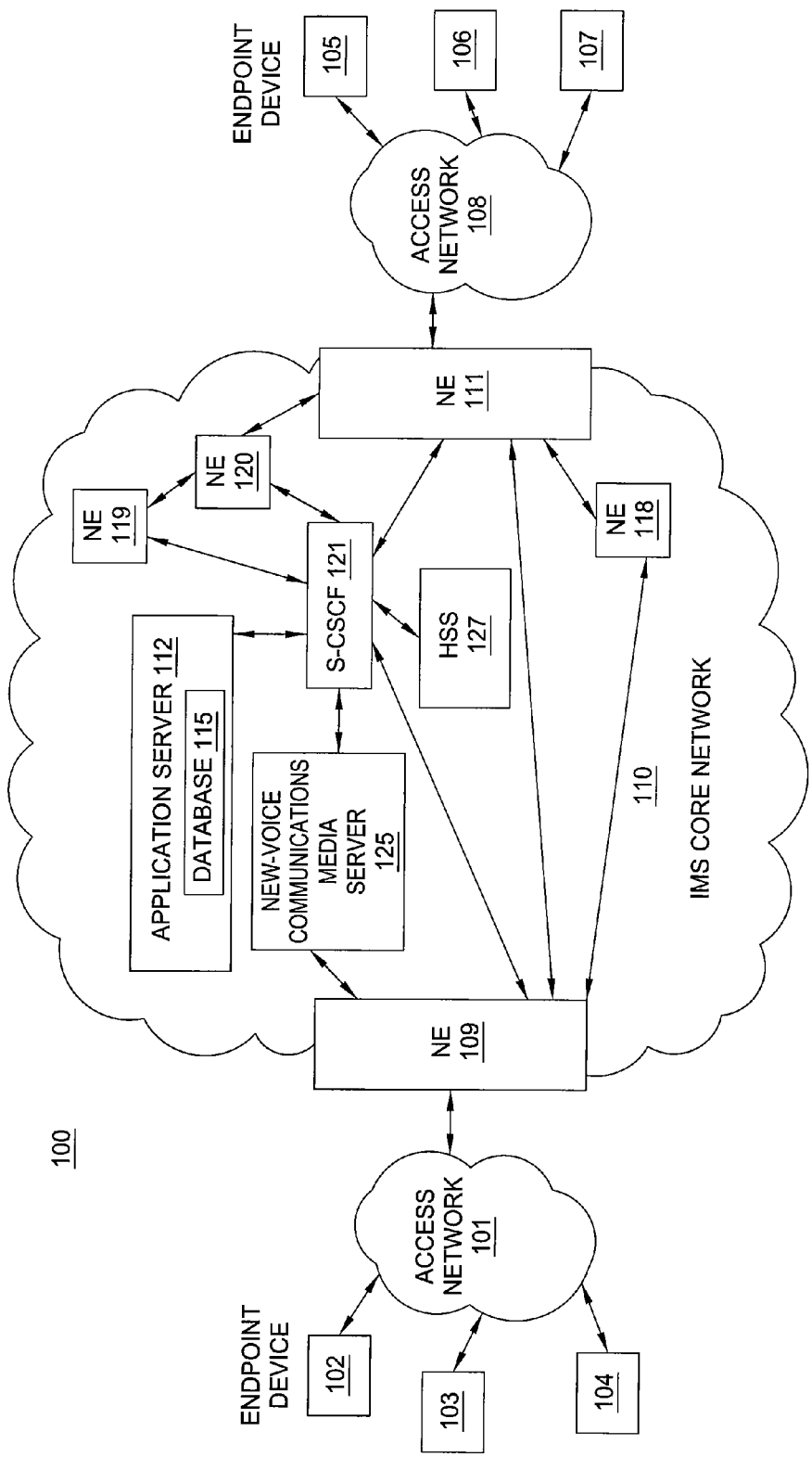
FIG. 1 illustrates an exemplary network related to the present disclosure.

To better understand the present disclosure, FIG. 1 illustrates an example network 100, e.g., an Internet Protocol (IP) Multimedia Subsystem network related to the present disclosure. An IP network is broadly defined as a network that uses Internet Protocol to exchange data packets. Exemplary IP Multimedia Subsystem (IMS) networks include Internet protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), mobile phones, email devices, messaging devices, and the like. The access networks 101 and 108 serve as a means to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, a core router, or like device.

The IMS core network 110 also comprises a Home Subscriber Server (HSS) 127, a Serving—Call Session Control Function (S-CSCF) 121, a non-voice communication server 125, and an Application Server 112 that contains a database 115. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g. VoIP services). The S-CSCF interacts with the appropriate VoIP/SoIP service related applications servers (e.g., 112) when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g. various VoIP servers). For example, the S-CSCF may need to interact with another server for translation of an E.164 voice network address into an IP address, and so on.

The non-voice communication server 125 is a server that typically handles and terminates non-voice communications to provide non-voice communication services such as email, short message service (SMS) or instant messaging (IM).

The application server 112 may comprise any server or computer that is well known in the art, and the database 115 may be any type of electronic collection of data that is also well known in the art. In one embodiment, the database 115 may store employment data of all employees of an enterprise as discussed below. Those skilled in the art will realize that the communication system 100 may be expanded by including additional endpoint devices, access networks, network elements, application servers, etc. without altering the scope of the present disclosure.

The above IP network is described to provide an illustrative environment in which packets for voice and data services are transmitted on networks. The current disclosure discloses a method and apparatus for creating a social network map of non-voice communications in an exemplary communication network illustrated in FIG. 1 and as described above.

Figure 2:
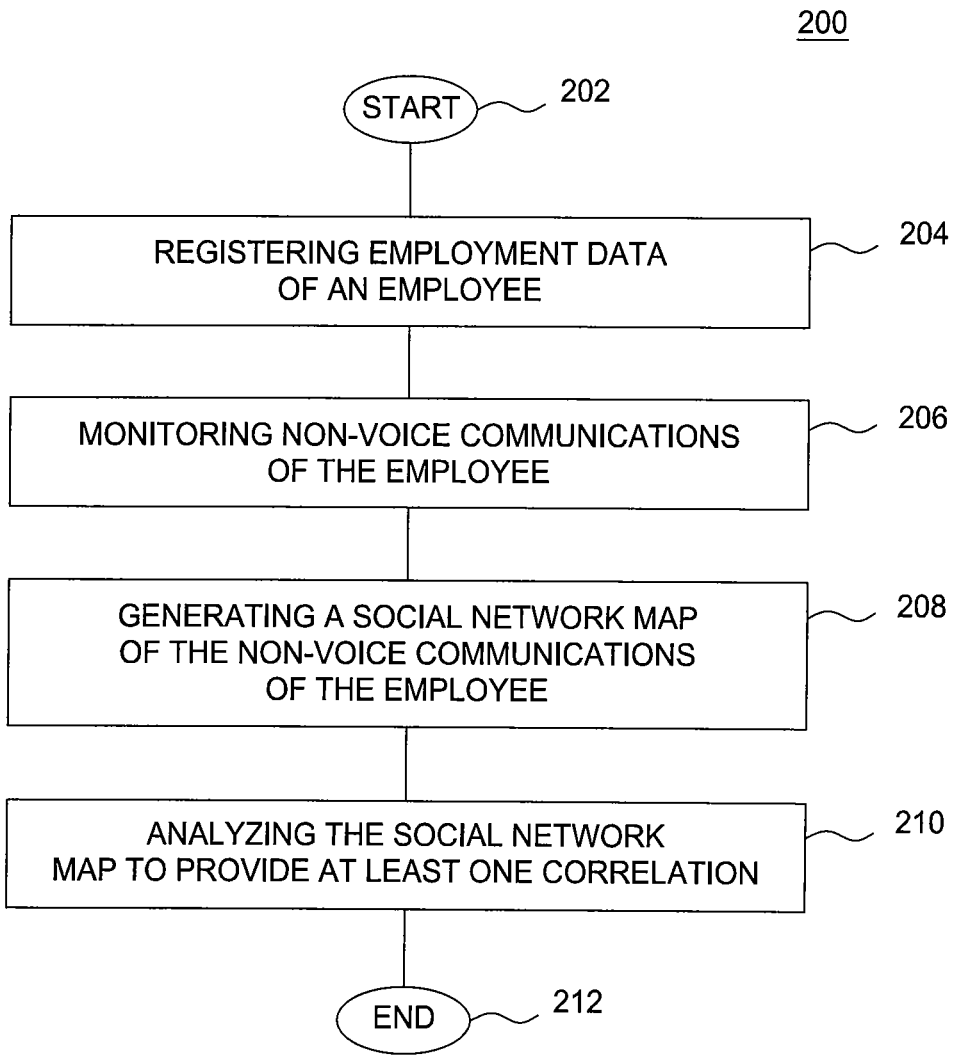
FIG. 2 illustrates a flowchart of a method for creating a social network map of non-voice communications.

FIG. 2 illustrates a flowchart of a method 200 for creating a social network map using non-voice communications. In one embodiment, one or more steps of the method 200 may be implemented by the application server 112 or a general purpose computer having a processor, a memory and input/output devices as illustrated below in FIG. 4.

The method 200 begins at step 202. At step 204, the method 200 registers employment data of an employee. For example, all employees of an enterprise may be required to register their employment data, which may be stored in database 115. In one embodiment, employment data may include an employee name, a title, a job function, a department, an address (e.g., an email address, a work address, a department address or an IP address) or a project.

At step 206, the method 200 monitors non-voice communications of the employee. In one embodiment, non-voice communications may include email messages, short message service (SMS) messages or instant messaging (IM) messages. Monitoring may be performed by collecting meta-data associated with each one of the non-voice communications of the employee. For example, the meta-data may include information, such as for example, a recipient of the non-voice communications, an internet protocol (IP) address or physical location of the recipient, when the non-voice communication was transmitted, a duration time for transmission of the non-voice communication and the like.

In one embodiment, the meta-data may be collected in real-time (e.g., while the communication is on-going or when a session is active). As a result, the real-time meta-data may be used to provide insight or a correlation to real-time trends of non-voice communications. This allows for quick detection of potential security threats, as will be discussed below.

At step 208, the method 200 generates a social network map of the non-voice communications of the employee. The social network map provides a view of whom the employee has had non-voice communications with over a predefined period of time (e.g., one hour, one day, one week, a quarter or two years). In another embodiment, the social network map may provide a view of whom all employees or a selected subset of employees have had non-voice communications with over a predefined period of time. As a result, analysis of the social network map will quickly provide important information.

In one embodiment, the social network map is generated by correlating information from the employment data to meta-data associated with each one of the non-voice communications of the employee. For example, when the employee sends an email to Jane Doe, meta-data information will include the recipient's name, Jane Doe. The method 200 may find employment data on a corresponding name entry in the employment database, e.g., Jane Doe. As a result, additional information about Jane Doe in the employment database including information such as a title, a job function, a department, an address or a project, as discussed above, may be associated with the non-voice communication.

Figure 3:
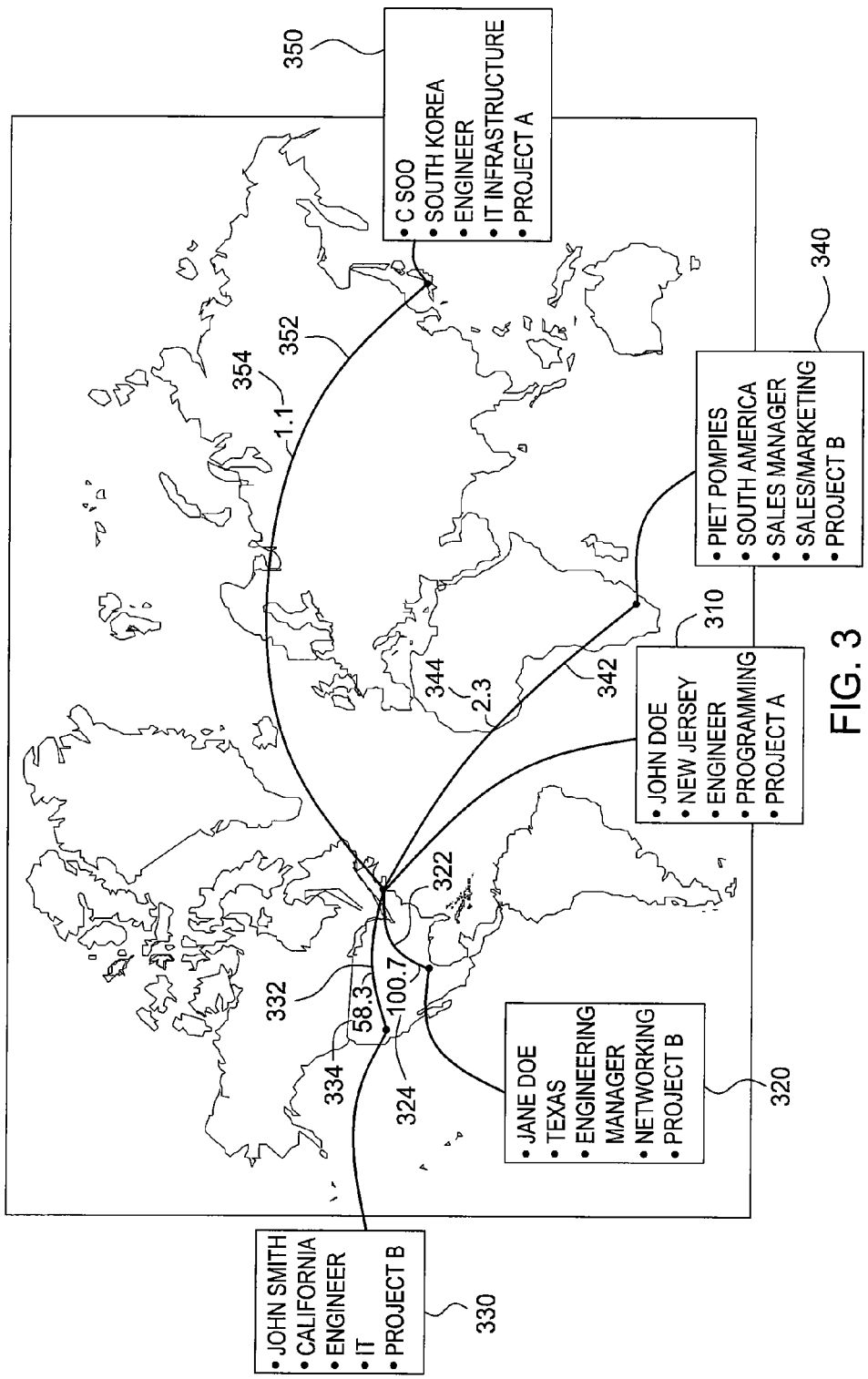
FIG. 3 illustrates an example social network map of non-voice communications.

The social network map may display a variety of information. For example, the social network map may display detailed information of each employee. For example, the detailed information of the employee that is displayed may include, for example, an employee name, a title, a job function, a department, an address (e.g., an email address, a work address, a department address or an IP address) or a project. The social network map may display each employee with a marker at their respective physical location if a geographical view is used. The social network map may display a link between employees who have communicated with each other. The social network map may display information associated with the link, such as for example, a number of communications between the employees, a weight assigned to the communications between the employees or a score for the communications between the employees, as will be discussed below. The social network map may also display a notification regarding a correlation, as will be discussed below. One example of the social network map is illustrated in FIG. 3 and is described below.

This process may be repeated for each non-voice communication by the employee that is monitored over the predefined time period. As a result, a list of one or more recipients and one or more locations of the non-voice communications may be determined based upon a correlation of the meta-data to employee data in the employment database. In addition, the method 200 may track a number of times non-voice communications were exchanged with each one of the one or more recipients and one or more locations. In addition, if the non-voice communications was sent to a recipient who is not in the employment database, then the method 200 may note the non-voice communication as an "other" category.

Subsequently, a link may be associated between the employee and each one of the one or more recipients. In one embodiment, a score for each link between the employee and the one or more recipients may be generated by multiplying a communication frequency by a weight. For example, the weight may be assigned for different non-voice communications to different recipients. The weight may be based on any number of factors, for example, an importance of a particular recipient, the number of non-voice communications that are sent to the particular recipient, a number of responses received from the particular recipient, and the like. For example, if Jane Doe is a manager of a project that the employee is working on, then the link between the employee and manager Jane Doe may be assigned a higher weight (e.g., 1.2). If the communication frequency to Jane Doe is 100 times for a quarter (e.g., three months), then the score may be 120. The score is generated for the link between the employee and Jane Doe by multiplying the communication frequency (100) by the weight (1.2).

Moreover, the score may change over a period of time. For example, as more or less communications per a predefined time period are made to Jane Doe, the score may increase or decrease accordingly. Similarly, the weight may change over a period of time. For example, as communications with Jane Doe become more or less important, as job responsibilities shift or as assignments to projects change the weight may also change, thereby, increasing or decreasing the score.

At step 210, the method 200 analyzes the social network map to provide at least one correlation. For example, the social network map may be analyzed to quickly deduce information. The at least one correlation may include a correlation to network resources, a correlation to policy or a correlation to trend analysis.

For example, using the social network map the enterprise is able to determine that the link between the employee and Jane Doe has the highest score. However, it is also determined that the communication path between the employee and Jane Doe is relatively slow or has a high number of reported problems (e.g., delayed message transmissions). For example, this may be detected by the transmission times in the meta-data that was collected during the monitoring step. Based upon the analysis of the social network map a correlation may be made that more network resources needs to be deployed to support non-voice communications between the employee and Jane Doe. For example, more bandwidth may be reserved, additional routers may be deployed, a higher Quality of Service (QoS) level may need to be maintained, and the like.

In another example, using the social network map the enterprise may see that the employee has a high number of links to "others". As discussed above, "others" may be recipients who have no employee data in the employer database. As a result, based upon the analysis of the social network map a correlation may be made that a company policy of limiting non-work related communications is being violated by the employee.

Other correlations to other policies may also be made. For example, the social network map may be used to ensure that screening (e.g., a "Chinese Wall") between employees in two different groups is being enforced or that required collaboration between employees in two different groups is being enforced. For example, email messages between an auditing group and a group being audited may be improper under a corporate policy.

In another example, the social network map may be analyzed to correlate a trend. For example, the social network map may display employment data of the recipient and over any time period specified by the employee. As a result, the social network map may illustrate that the employee contacted Jane Doe, who is an expert on networking, 100 times two years ago. This may help the employee to find an expert on a particular topic or area of technology if the employee cannot remember who the expert on the particular topic or area of technology was.

In another embodiment, the employee may use the social network map to correlate a trend of where the employee is spending most of their time. For example, the employee may see from the social network map that they are supposed to be spending most of their time on Project A. However, the employee may see that most of their non-voice communications is with other employees who are on Project B. Thus, the employee may use the social network map to shift their priority back to project A.

In another embodiment, using the social network map the enterprise may see that John Doe has sent 1000 emails to various other employees within a short duration, e.g., 1 hour. As noted above, using real-time meta-data of the non-voice communications of John Doe, the enterprise may correlate a trend to a potential security threat. For example, the social network map may provide visual information in real time that a virus attack is underway. For example, a historical trend of non-voice communication patterns may be stored and an alarm may be raised if the social network map shows that the historical trend of non-voice communication patterns is not being followed, by a wide margin, e.g., by several order of differences.

In another embodiment, using the social network map the enterprise may determine that the employee has a high score on a link associated with another employee in China. Based upon the analysis of the social network map a correlation may be made to some current event occurring in China. For example, if a new flu outbreak is occurring in China and the enterprise correlates the high score of the link associated with another employee in China with the current event of a new flu outbreak in China, the enterprise may take actions to protect its employees. The method 200 ends at step 212.

FIG. 3 illustrates an example of a social network map 300. The social network map 300 may be displayed as a graphical user interface (GUI) on a display of an employee's terminal. For example, various hardware devices associated with a general purpose computer capable of generating the GUI are discussed below in association with FIG. 4.

In one embodiment, the social network map 300 may be a geographic view, a functional view, a project based view or an individual view or any combination thereof. For example, FIG. 3 illustrates the social network map 300 in a geographic view from the perspective of an individual employee, John Doe 310. A geographic view may display a world map with a marker for each employee at a respective location, as illustrated by example in FIG. 3. A functional view may show a view of block diagrams, with each block representing a job function group. The social network map of a functional view may show which job function groups have communicated with one another. A project based view may show a view of block diagrams, with each block representing a project group. The social network map of a project based view may show which project groups have communicated with one another. An individual view may show a perspective from a single employee or individual.

The social network map 300 illustrates all of the recipients 320, 330, 340 and 350 and associated locations that John Doe 310 has had non-voice communications with over a pre-defined period of time (e.g., 1 year). As discussed above, links 322, 332, 342 and 352 are associated with each one of the recipients 320, 330, 340 and 350. In addition, a score 324, 334, 344 and 354 is generated for each one of the links 322, 332, 342 and 352.

In addition, the social network map 300 displays employment data of for John Doe 310 and each of the recipients 320, 330, 340 and 350. For example, the employment data may include a name of the employee, a location, a title, a job function and a project. Although, the above employment data is illustrated by example, it should be noted that any employment data may be displayed on the social network map 300.

Thus, using the social network map an analysis may be performed to provide at least one correlation as discussed above. For example, an enterprise may correlate that more network resources should be deployed between John Doe 310 and recipients 320 and 330 because the score associated with links 324 and 334 are 100.7 and 58.3, respectively. Alternatively, John Doe 310 may correlate a trend based upon the social network map 300 that he is spending too much time communicating with Jane Doe 320 and John Smith 330 who work on Project B, rather than communicating with C. Soo 350 who is on Project A with John Doe 310. Thus, John Doe 310 may shift his priority to communicating more with C. Soo 350 rather than Jane Doe 320 and John Smith 330. As discussed above, the social network map 300 may be used to make other correlations such as correlations to determine if various company policies are being enforced properly or breached.

Although the above methods are described within the context of an enterprise and the enterprise's employees, it should be noted that the methods described above may be extended to other contexts. For example, the method may be applied within a broader social context of wireless subscribers of a service provider. As such, subscriber information may be correlated with meta-data of text messages exchanged by subscribers of a wireless network of the service provider to create a social network map of the wireless subscribers.

However, the wireless subscribers must register pertinent information so as to be part of a group. For example, a group of boy scouts who are wireless subscribers can be registered as a group. Alternatively, a group of students who are subscribers can be registered as a group. For each group, pertinent group data can be registered, e.g., boy scout rank, boy scout project, boy scout troop number, student grade level, classes taken, education programs, etc.

Figure 4:
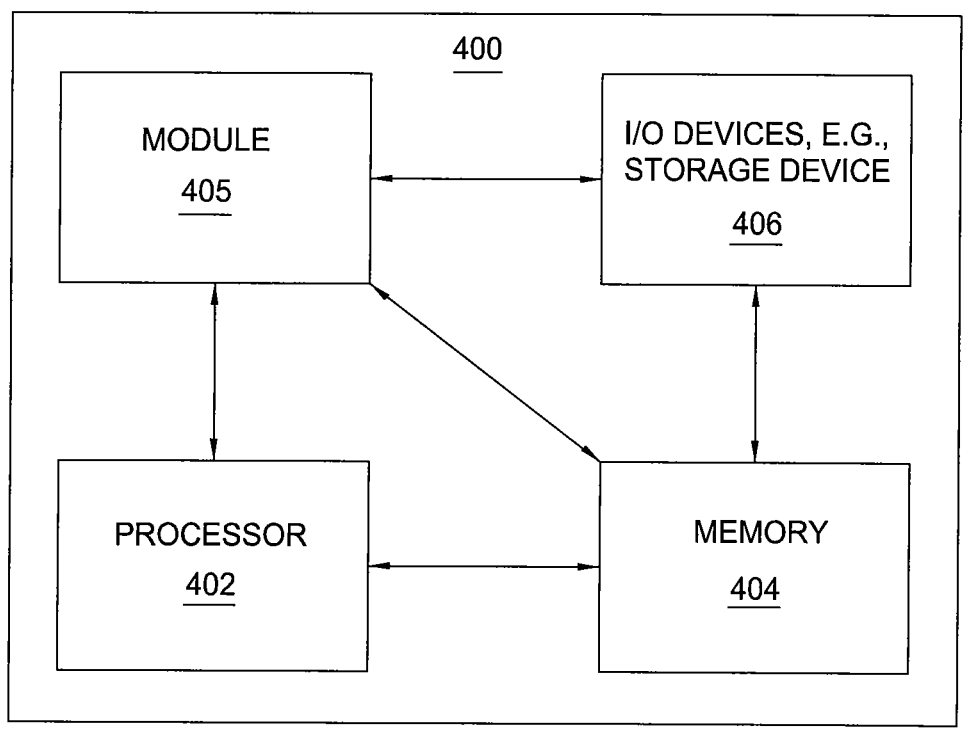
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for creating a social network map using non-voice communications, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 405 for creating a social network map using non-voice communications can be loaded into memory 404 and executed by processor 402 to implement the functions as discussed above. As such, the present method 405 for creating a social network map using non-voice communications (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for creating a social network map using non-voice communications, comprising:
    registering, by a processor, employment data of an employee; monitoring, by the processor, non-voice communications of the employee;
    generating, by the processor, a social network map of the non-voice communications of the employee and in accordance with the employment data;
    analyzing, by the processor, the social network map to provide a correlation to a network resource; and
    reallocating, by the processor, an additional network resource between the employee and another employee in the social network map based upon the correlation to support non-voice communications between the employee and the another employee;
    wherein the generating comprises: correlating information from the employment data to meta data associated with each one of the non-voice communications; determining a recipient and a location of each one of the non-voice communications based upon the correlating; associating a link between the employee and the recipient; and generating a score for each link between the employee and the recipient.

2. The method of claim 1, wherein the employment data comprises a job function.

3. The method of claim 1, wherein the monitoring comprises:
    collecting meta data associated with each one of the non-voice communications.

4. The method of claim 1, wherein the score is calculated based upon a frequency of non-voice communications to a respective the recipient and a weight.

5. The method of claim 1, wherein the social network map comprises a geographic view.

6. The method of claim 5, wherein the geographic view displays the recipient at the location.

7. The method of claim 1, wherein the non-voice communications comprise an email.

8. A non-transitory computer-readable medium having stored thereon to store a plurality of instructions, the plurality of instructions including instructions which, when executed by a processor, cause the processor to perform a method operations for creating a social network map using non-voice communications, the operations comprising:
    registering employment data of an employee;
    monitoring non-voice communications of the employee;
    generating a social network map of the non-voice communications of the employee and in accordance with the employment data;
    analyzing the social network map to provide a correlation to a network resource; and reallocating an additional network resource between the employee and another employee in the social network map based upon the correlation to support non-voice communications between the employee and the another employee;
    wherein the generating comprises:
    correlating information from the employment data to meta data associated with each one of the non-voice communications;
    determining a recipient and a location of each one of the non-voice communications based upon the correlating;
    associating a link between the employee and the recipient; and
    generating a score for each link between the employee and the recipient.

9. The tangible computer readable medium of claim 8, wherein the employment data comprises a job function.

10. The tangible computer readable medium of claim 8, wherein the monitoring comprises:
    collecting meta data associated with each one of the non-voice communications.

11. The non-transitory computer readable medium of claim 8, wherein the score is calculated based upon a frequency of non-voice communications to a respective the recipient and a weight.

12. The non-transitory computer readable medium of claim 8, wherein the social network map comprises a geographic view.

13. The tangible computer readable medium of claim 12, wherein the geographic view displays the recipient at the location.

14. The tangible computer readable medium of claim 8, wherein the non-voice communications comprise an email.

15. An apparatus for creating a social network map using non-voice communications, comprising: a processor; and a computer-readable medium in communication with the processor, to store a plurality of instructions including instructions which, when executed by the processor, cause the processor to perform operations, the operations comprising:
  registering employment data of an employee; monitoring non-voice communications of the employee;
  generating a social network map of the non-voice communications of the employee and in accordance with the employment data;
  and analyzing the social network map to provide a correlation to a network resource; and
  reallocating an additional network resource between the employee and another employee in the social network map based upon the correlation to support non-voice communications between the employee and the another employee;
  wherein the generating comprises:
  correlating information from the employment data to meta data associated with the non-voice communications;
  determining a recipient and a location of each one of the non-voice communications based upon the information that is correlated;
  associating a link between the employee and the recipient; and
  generating a score for each link between the employee and the recipient.

16. The method of claim 1, wherein the non-voice communications comprise a short message service message.

17. The method of claim 1, wherein the non-voice communications comprise an instant message.

\* \* \* \* \*